United States Patent
Peng et al.

(10) Patent No.: US 12,125,131 B2
(45) Date of Patent: Oct. 22, 2024

(54) METHOD OF GENERATING 3D VIDEO, METHOD OF TRAINING MODEL, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Zhe Peng, Beijing (CN); Yuqiang Liu, Beijing (CN); Fanyu Geng, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 93 days.

(21) Appl. No.: 18/075,346

(22) Filed: Dec. 5, 2022

(65) Prior Publication Data

US 2023/0177756 A1     Jun. 8, 2023

(30) Foreign Application Priority Data

Dec. 7, 2021   (CN) .......................... 202111494562.2

(51) Int. Cl.
*G06T 13/40*      (2011.01)
*G06T 7/20*       (2017.01)
(Continued)

(52) U.S. Cl.
CPC ................ *G06T 13/40* (2013.01); *G06T 7/20* (2013.01); *G10L 15/02* (2013.01); *G10L 15/063* (2013.01);
(Continued)

(58) Field of Classification Search
CPC . G06T 2207/20081; G06T 2207/20084; G06T 15/04; G06T 17/00; G06T 19/20;
(Continued)

(56) References Cited

U.S. PATENT DOCUMENTS

2009/0132371 A1   5/2009  Strietzel et al.
2020/0005806 A1*  1/2020  Seo .................... H04M 9/082
(Continued)

FOREIGN PATENT DOCUMENTS

CN    111243065    6/2020
CN    111261187    6/2020
(Continued)

OTHER PUBLICATIONS

European Search Report issued in the corresponding European Patent Application No. 22211919 dated Feb. 17, 2023.
(Continued)

*Primary Examiner* — Ming Wu
(74) *Attorney, Agent, or Firm* — Pillsbury Winthrop Shaw Pittman, LLP (57) ABSTRACT

A method of generating a 3D video, a method of training a neural network model, an electronic device, and a storage medium, which relate to a field of image processing, and in particular to technical fields of computer vision, augmented/virtual reality and deep learning. The method includes: determining, based on an input speech feature, a principal component analysis (PCA) coefficient by using a first network, wherein the PCA coefficient is used to generate the 3D video; correcting the PCA coefficient by using a second network; generating a lip movement information based on the corrected PCA coefficient and a PCA parameter for a neural network model, wherein the neural network model includes the first network and the second network; and applying the lip movement information to a pre-constructed 3D basic avatar model to obtain a 3D video with a lip movement effect.

20 Claims, 9 Drawing Sheets

(51) Int. Cl.
- G10L 15/02 (2006.01)
- G10L 15/06 (2013.01)
- G10L 15/16 (2006.01)
- G10L 25/57 (2013.01)

(52) U.S. Cl.
CPC .............. G10L 15/16 (2013.01); G10L 25/57 (2013.01); *G06T 2207/20081* (2013.01); *G06T 2207/20084* (2013.01); *G06T 2207/30201* (2013.01)

(58) Field of Classification Search
CPC ... G06T 2207/10024; G06T 2219/2021; G06T 7/246; G06T 13/40; G06T 2207/30201; G06T 7/20

See application file for complete search history.

(56) References Cited

U.S. PATENT DOCUMENTS

| | | | | |
|---|---|---|---|---|
| 2020/0128143 | A1* | 4/2020 | Nishioka | G10L 15/25 |
| 2020/0294042 | A1* | 9/2020 | Day | G07F 19/201 |
| 2021/0209362 | A1* | 7/2021 | Wexler | G06V 40/20 |
| 2021/0233416 | A1* | 7/2021 | John | B64U 30/26 |
| 2021/0289300 | A1* | 9/2021 | Tiefenau | H04R 25/43 |
| 2021/0337307 | A1* | 10/2021 | Wexler | G06V 40/161 |

FOREIGN PATENT DOCUMENTS

| | | |
|---|---|---|
| CN | 111476878 | 7/2020 |
| CN | 112465935 | 3/2021 |
| WO | 2021/023869 | 2/2021 |
| WO | 2021073416 | 4/2021 |

OTHER PUBLICATIONS

Office Action dated Aug. 2, 2022, issued in corresponding Chinese Patent Application No. 202111494562.2, pp. 1-6.

European Search Report issued in corresponding European Patent Application No. 22211919, dated Feb. 17, 2023.

X. Wen et al., "Photorealistic Audio-driven Video Portraits", IEEE Transactions on Visualization and Computer Graphics, vol. 26, No. 12, pp. 3457-3466 (Dec. 12, 2020).

B. Fan et al., A deep bidirectional LSTM approach for video-realistic talking head, Multimedia Tools and Applications, vol. 75, No. 9, Wolters Academic Publishers, pp. 5287-5309 (2016).

* cited by examiner

METHOD OF GENERATING 3D VIDEO, METHOD OF TRAINING MODEL, ELECTRONIC DEVICE, AND STORAGE MEDIUM

This application is claims priority to Chinese Application No. 202111494562.2 filed on Dec. 7, 2021, which is incorporated herein in its entirety by reference.

TECHNICAL FIELD

The present disclosure relates to a field of image processing, in particular to technical fields of computer vision, augmented/virtual reality and deep learning, and specifically to a method of generating a 3D video, a method of training a neural network model, an electronic device, and a storage medium.

BACKGROUND

In fields of video production, video games, and self-service customer service, 3D video generation is required. Among them, lip movement is an important part of the 3D video generation process.

The 3D video generation is usually limited by Blendshape, which is mostly man-made, so the generated lip movement is lacking in expressiveness and details.

SUMMARY

The present disclosure provides a method of generating a 3D video, a method of training a neural network model, an electronic device, and a storage medium.

According to an aspect of the present disclosure, a method of generating a 3D video is provided, including:
  determining, based on an input speech feature, a principal component analysis (PCA) coefficient by using a first network, wherein the PCA coefficient is used to generate the 3D video;
  correcting the PCA coefficient by using a second network;
  generating a lip movement information based on the corrected PCA coefficient and a PCA parameter for a neural network model, wherein the neural network model includes the first network and the second network; and
  applying the lip movement information to a pre-constructed 3D basic avatar model to obtain a 3D video with a lip movement effect.

According to another aspect of the present disclosure, a method of training a neural network model is provided, wherein the neural network model includes a first network and a second network, and the method includes:
  determining, based on a first speech feature, a first principal component analysis (PCA) coefficient by using the first network;
  determining, based on a second speech feature, a second PCA coefficient by using the first network, and correcting the second PCA coefficient by using the second network;
  generating a lip movement information based on the corrected second PCA coefficient and a PCA parameter for the neural network model, and applying the lip movement information to a pre-constructed 3D basic avatar model to obtain a 3D video with a lip movement effect;
  calculating a first loss function between the first PCA coefficient and a reference PCA coefficient, and a second loss function between the generated lip movement information and a target lip movement information; and
  adjusting, based on the first loss function and the second loss function, a parameter of the first network and a parameter of the second network.

According to another aspect of the present disclosure, an electronic device is provided, including:
  at least one processor; and
  a memory communicatively connected to the at least one processor, wherein the memory stores instructions executable by the at least one processor, and the instructions, when executed by the at least one processor, cause the at least one processor to implement the above-mentioned method.

According to another aspect of the present disclosure, a non-transitory computer-readable storage medium having computer instructions stored thereon is provided, wherein the computer instructions are used to cause a computer to implement the above-mentioned method.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the present disclosure better and do not constitute a limitation to the present disclosure, in which.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

Figure 1:
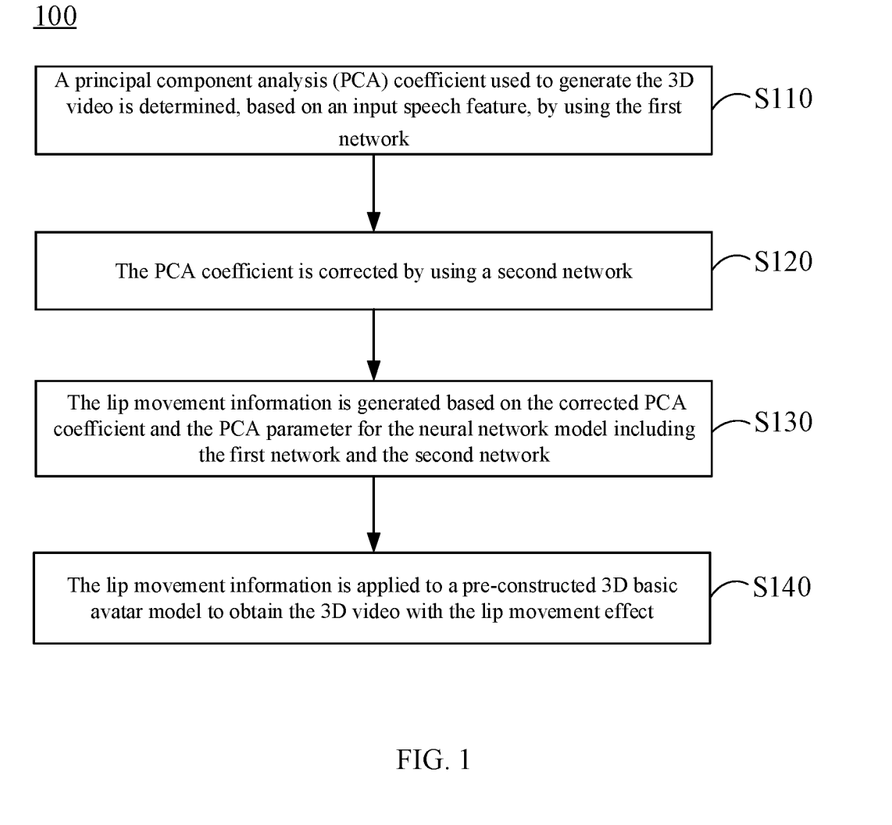
FIG. 1 is a flowchart of a method of generating a 3D video according to an embodiment of the present disclosure.

FIG. 1 is a flowchart of a method 100 of generating a 3D video according to an embodiment of the present disclosure.

As shown in FIG. 1, the method of generating the 3D video includes operations S110 to S140. The method may use a neural network model including a first network and a second network.

In operation S110, a principal component analysis (PCA) coefficient used to generate the 3D video is determined, based on an input speech feature, by using the first network. The PCA technology aims to use the idea of dimensionality reduction to convert high-dimensional data into low-dimensional data, so as to extract the main feature classification of the data. In the process of PCA processing, the dimensionality reduction is achieved by projecting a high-dimensional feature to a PCA parameter to obtain a low-dimensional feature. A feature vector obtained by the dimensionality reduction is further called the PCA coefficient. The PCA parameter is calculated during a PCA calculation process, which may be a vector. Assuming that a plurality of 3D models may be represented as a matric having a size of N*(V*3), wherein V represents the number of vertices of the 3D model, the PCA parameter may be a vector having a size of M*(V*3), and the PCA coefficient may be a vector having a size of T*M.

The so-called 3D video here usually refers to a sequence of avatars arranged by time, so it may be embodied in a form of animation, which is generally applied in fields such as a video game, video production and self-service customer service. For example, a 3D avatar is presented in scenarios such as a game, an animation, or an intelligent self-service to interact with a user.

The input speech feature here may be, for example, a speech feature extracted from audio data, a speech feature obtained by performing text-to-speech (TTS) conversion on a text, or a speech feature obtained by other methods. A method of acquiring the speech feature may be selected as desired in practice, which is not limited here.

The so-called first network here may include, for example, a long-short term memory (LSTM) network. The first network may further be implemented by other suitable types of neural networks, which may be selected as desired in practice.

In the embodiments of the present disclosure, the first network may, for example, adopt the LSTM network. After acquiring the input speech feature based on the above-described manner, the first network, such as the LSTM network, is used to process the input speech feature to determine the PCA coefficient used to generate the 3D video.

In operation S120, the PCA coefficient is corrected by using a second network.

The so-called second network here may include, for example, a convolutional neural network (CNN) or other suitable models.

In the embodiments of the present disclosure, CNN network may be chosen as the second network.

For example, after determining, based on the input speech feature, the PCA coefficient used to generate the 3D video by using the first network e.g. the LSTM network, the second network e.g. the CNN network may be used to correct the PCA coefficient to obtain a corrected PCA coefficient. The corrected PCA coefficient will be used later to generate a lip movement information. By using the second network to correct the 3D-PCA coefficient, the effect of the generated 3D video may be more similar to the effect of a character in 2D data.

Compared with a 3D video generation model in the related art, the neural network model including the first network (e.g. the LSTM network) and the second network (e.g. the CNN network) in the embodiment has a simpler structure.

In operation S130, the lip movement information is generated based on the corrected PCA coefficient and the PCA parameter for the neural network model including the first network and the second network.

The generation of the PCA parameter here will be described in detail later.

The 4D data may include, for example, a sequence of 3D avatar models and corresponding first audio data. For example, the 4D data may include a plurality of frames. Each frame is a 3D avatar model. The 3D avatar model includes a plurality of vertices. Each vertex may be represented by a three-dimensional coordinate (such as x, y and z). That is, the 4D data may include a sequence of 3D avatar models arranged by time. The 4D data may further include audio data corresponding to the sequence of 3D avatar models arranged by time. For example, a position change information of a plurality of points on a face of an object such as a person (also known as a character) during a facial activity (such as speaking, making an expression, etc.) and audio data generated due to speaking may be collected by recording. The sequence of 3D avatar models arranged by time may be generated based on the position change information of the plurality of points on the face. The generated sequence of 3D avatar models arranged by time may be combined with the recorded audio data to obtain the 4D data. The 2D data may include, for example, 2D image data of a specified character and corresponding second audio data. The specified character may be the same as or different from the character used for acquiring the 4D data, and the number of specified characters may be one or more, which may be set as desired in practice and is not limited here.

In addition, the above-mentioned 4D data and 2D data may be acquired by recording, or may be extracted from a data source (such as a network resource), which is not specifically limited.

The so-called lip movement information here refers to a change information of a speaker's lip when speaking in captured data, which reflects the inherent physiological characteristics of the speaker's lip, and the personality behavior characteristics of the changes in the lip movement. The lip movement information may be a feature vector containing a lip movement feature. For example, a lip information corresponding to the speaker in a sequence of time instants may be extracted. The lip information reflects the lip movement of the speaker in the sequence of time instants. Based on the lip information corresponding to all the sequences of time instants, all the lip movements of the speaker occurring within corresponding time period may be obtained. Such lip movements may be used in the future to obtain the 3D video with a lip movement effect.

In this operation, the lip movement information is generated based on the above-mentioned corrected PCA coefficient and the PCA parameter for the neural network model acquired in the above-described manner. The lip movement information will be subsequently applied to a 3D basic avatar model in a case of closing the mouth, so as to obtain a 3D video with the lip movement effect.

In operation S140, the lip movement information is applied to a pre-constructed 3D basic avatar model to obtain the 3D video with the lip movement effect.

The so-called 3D video with the lip movement effect here means that a 3D character has a high degree of freedom, for example may achieve rotation, movement, etc. at any angle. In addition, the 3D character has better expressiveness and more details of lip movement.

In this embodiment, the pre-constructed 3D basic avatar model specifically refers to the 3D basic avatar model with the mouth being closed. The 3D basic avatar model may be constructed in any suitable manner as required, which will not be repeated here.

Since the process of generating the 3D video is not limited by Blendshape, it is not necessary to manually produce Blendshape that matches a 3D avatar character, so that the 3D basic avatar model may be flexibly constructed according to different 3D application scenarios. Compared with a method using Blendshape, the method in this embodiment may be applied to different 3D characters.

In this operation, the 3D video with the lip movement effect may be obtained by applying the lip movement information generated in the above manner to the pre-constructed 3D basic avatar model.

The technical solutions of the embodiments of the present disclosure generate the 3D video with the lip movement effect by using a new neural network model. The neural network model includes the first network (e.g. the LSTM network) and the second network (e.g. the CNN network), so as to achieve the generation of the 3D video with the lip movement effect in a simpler way.

In addition, since the process of generating the 3D video is not limited by Blendshape, the generated lip movement effect is better in terms of expressiveness and details compared with the 3D video generated by the Blendshape method. In addition, there is no need to manually produce Blendshape that matches the 3D avatar character, which may not only improve the generation efficiency of the 3D video with the lip movement effect and reduce labor costs, but also avoid a problem of limited application scope of the 3D avatar character due to the use of Blendshape.

Figure 2:
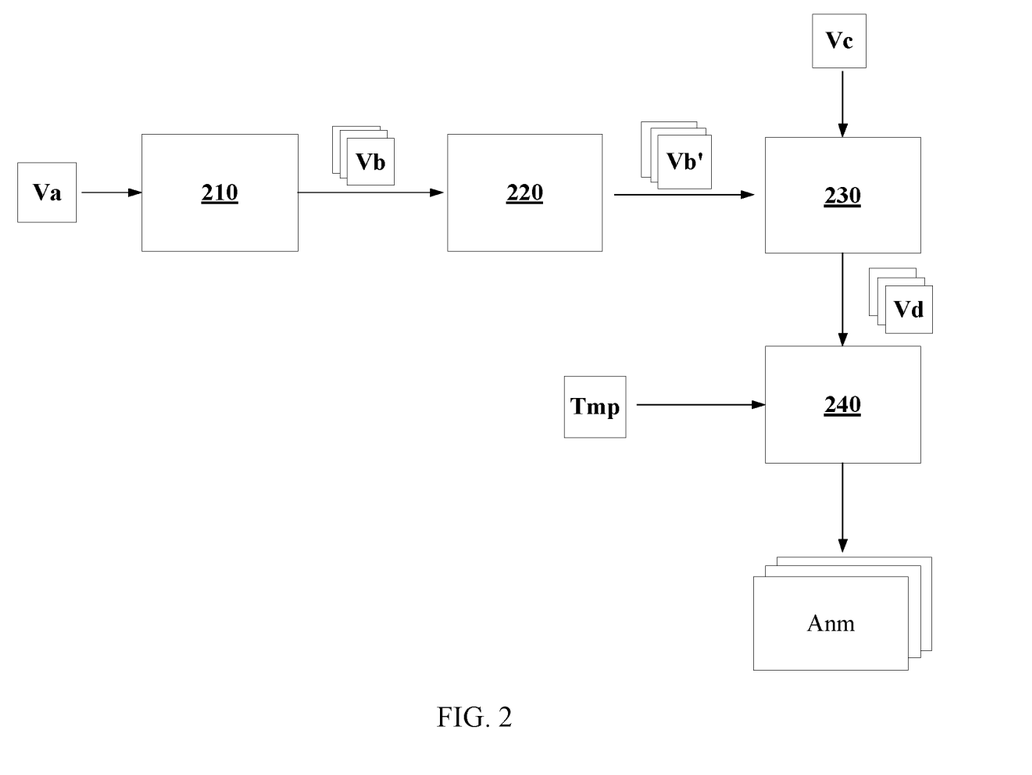
FIG. 2 is a schematic diagram of a method of generating a 3D video according to an embodiment of the present disclosure.

FIG. 2 is a schematic diagram of a method of generating a 3D video according to an embodiment of the present disclosure. Example implementations of the above operations S110 to S140 will be described below with reference to FIG. 2.

For example, a neural network model as shown in FIG. 2 is used to generate the 3D video with the lip movement effect. The neural network model includes the first network 210 (e.g. LSTM) and the second network 220 (e.g. CNN).

As shown in FIG. 2, after a speech feature Va is extracted in the manner described above, a PCA coefficient Vb is determined, based on the input speech feature Va, by using the first network 210, wherein the PCA coefficient Vb is used to generate the 3D video. The PCA coefficient Vb used to generate the 3D video is output to the second network 220. The second network 220 corrects the PCA coefficient Vb to obtain a corrected PCA coefficient Vb', and outputs the corrected PCA coefficient Vb'.

A lip movement information Vd is calculated (230) based on the corrected PCA coefficient Vb' and a PCA parameter Vc for the neural network model. The lip movement information Vd is applied (240) to a 3D basic avatar model Tmp with closed mouth, to obtain a 3D Video Anm with the lip movement effect. The lip movement information is the same as or similar to the definition described above, which is not repeated here. The PCA parameter Vc of the neural network model may be generated, for example, based on the 4D data and the 2D data, and a specific method of generating the PCA parameter Vc will be described in detail later.

The technical solutions of the embodiments of the present disclosure generate the 3D video with the lip movement effect by using a new neural network model. The neural network model includes the first network (e.g. the LSTM network) and the second network (e.g. the CNN network). Compared with a neural network model adopted in the related art, it has a simpler structure and achieves the generation of the 3D video with the lip movement effect in a simpler way.

In addition, since the process of generating the 3D video is not limited by Blendshape, the generated lip movement effect is better in terms of expressiveness and details compared with the 3D video generated by the Blendshape method. In addition, there is no need to manually produce Blendshape that matches the 3D avatar character, which may not only improve the generation efficiency of the 3D video with the lip movement effect and reduce labor costs, but also avoid the problem of limited application scope of the 3D avatar character due to the use of Blendshape.

Figure 3:
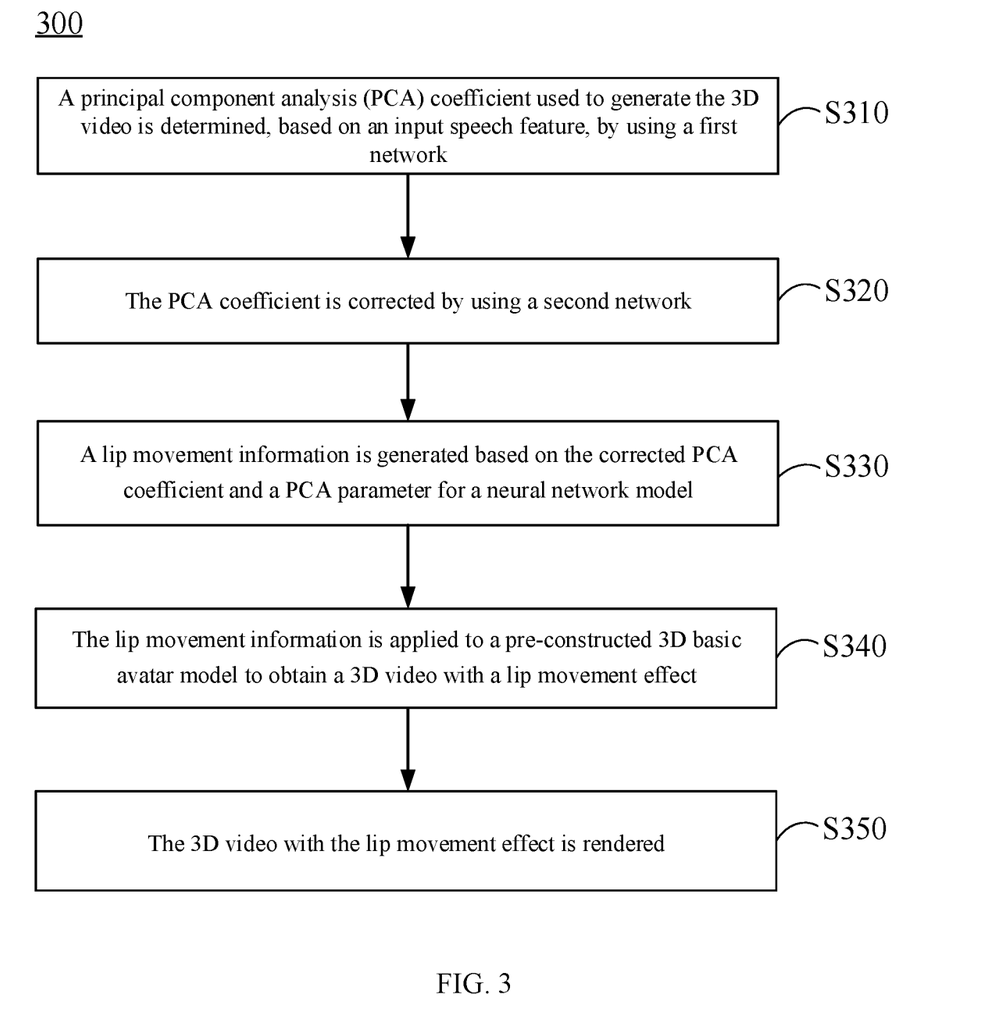
FIG. 3 is a flowchart of a method of generating a 3D video according to another embodiment of the present disclosure.

FIG. 3 is a flowchart of a method 300 of generating a 3D video according to another embodiment of the present disclosure.

As shown in FIG. 3, the method of generating the 3D video includes operations S310 to S350. The operations S310 to S340 may be implemented respectively in the same manner as the operations S110 to S140, and repeated parts will not be described in detail.

In operation S310, a principal component analysis (PCA) coefficient used to generate the 3D video is determined, based on an input speech feature, by using a first network.

In operation S320, the PCA coefficient is corrected by using a second network.

In operation S330, a lip movement information is generated based on the corrected PCA coefficient and a PCA parameter for a neural network model.

In operation S340, the lip movement information is applied to a pre-constructed 3D basic avatar model to obtain a 3D video with a lip movement effect.

In operation S350, the 3D video with the lip movement effect is rendered.

For example, the 3D video with the lip movement effect obtained according to the above description may be rendered in combination with a 3D scenario (such as a dialogue scenario in a game or an animation) and a prepared 3D avatar texture action, so as to make the rendered 3D avatar audio and video conform to the corresponding 3D scenario, and make the 3D character more vivid and lifelike.

In this embodiment, an appropriate rendering method may be selected according to the application scenario for rendering the 3D video with the lip movement effect, which is not limited herein.

Figure 4:
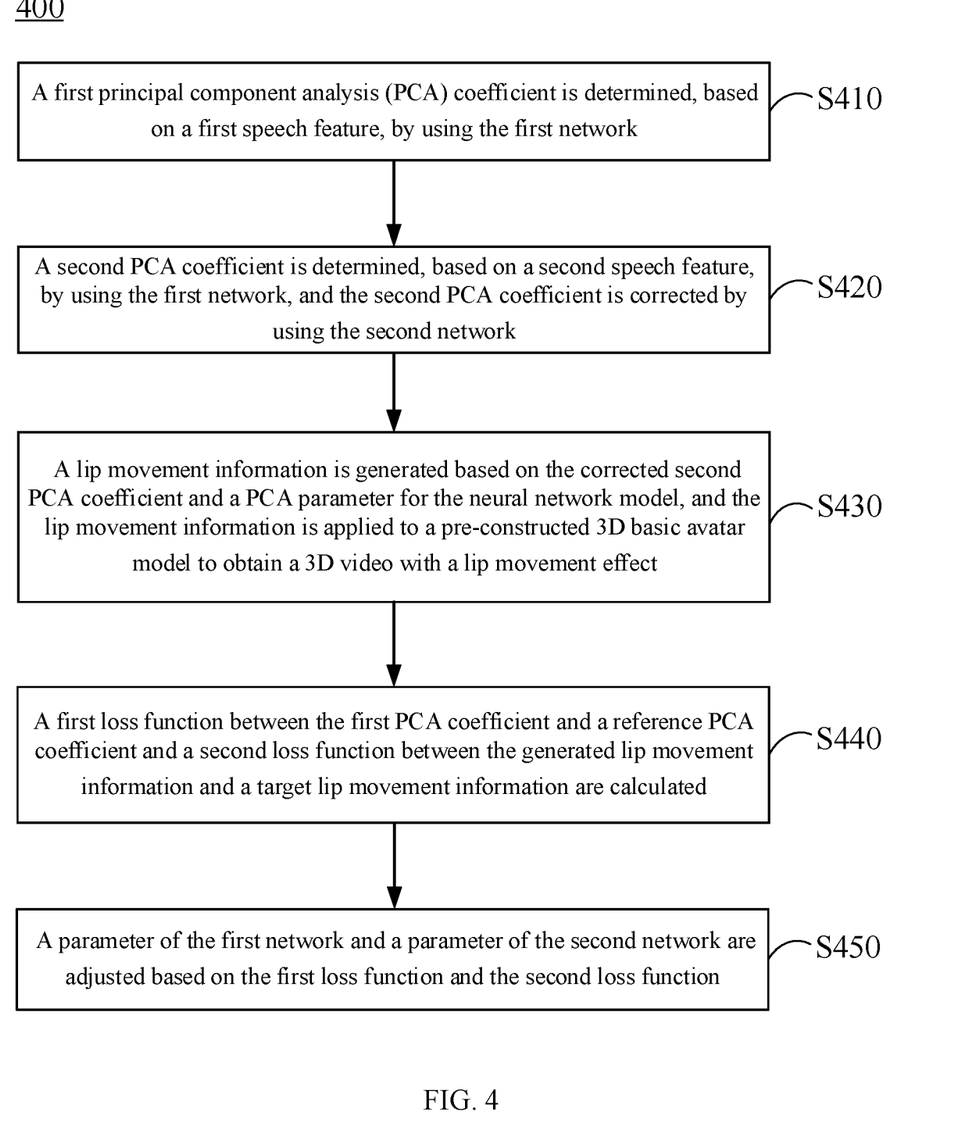
FIG. 4 is a flowchart of a method of training a neural network model according to an embodiment of the present disclosure.

FIG. 4 is a flowchart of a method 400 of training a neural network model according to an embodiment of the present disclosure. The method is suitable for training the neural network model used in the above method of generating the 3D video.

As shown in FIG. 4, the method of training the neural network model includes operations S410 to S450. The neural network model includes the first network and the second network. In the embodiments of the present disclosure, the definitions of the first network and the second network are the same as or similar to those described above, which will not be repeated here.

In operation S410, a first principal component analysis (PCA) coefficient is determined, based on a first speech feature, by using the first network.

The so-called first speech feature here may be generated based on, for example, the 4D data, and the generation process of the first speech feature will be described in detail later.

For example, the first PCA coefficient may be determined, based on the first speech feature, by using the LSTM network.

In operation S420, a second PCA coefficient is determined, based on a second speech feature, by using the first network, and the second PCA coefficient is corrected by using the second network.

The so-called second speech feature here may be generated based on, for example, the 2D data or the 4D data, and the generation process of the second speech feature will be described in detail later.

For example, the second PCA coefficient may be determined, based on the second speech feature, by using the LSTM network. The second PCA coefficient may be corrected by using the CNN network.

In operation S430, a lip movement information is generated based on the corrected second PCA coefficient and a PCA parameter for the neural network model, and the lip movement information is applied to a pre-constructed 3D basic avatar model to obtain a 3D video with a lip movement effect.

Operations S420 and S430 may be the same as or similar to the operations performed in the above-mentioned method of generating the video, so as to generate the 3D video with the lip movement effect, which will not be repeated here.

In operation S440, a first loss function between the first PCA coefficient and a reference PCA coefficient and a second loss function between the generated lip movement information and a target lip movement information are calculated.

The target lip movement information may include a 2D lip movement key point aligned with the 3D basic avatar model. For example, the target lip movement information may be generated based on the 2D data or the 4D data, and the generation process of the target lip movement information will be described in detail later.

The so-called reference PCA coefficient here may be generated, for example, based on the 4D data, and the generation process of the reference PCA coefficient will be described in detail later.

The so-called alignment here includes marking lip movement key point(s) of the 3D basic avatar model with the mouth being closed (called a 3D lip movement key point), aligning the 2D lip movement key point(s) with some of the vertices of the 3D basic avatar model, and then scaling the scale of the 2D lip movement key point.

In this operation, after obtaining the first PCA coefficient, the reference PCA coefficient, the lip movement information and the target lip movement information according to the above method, the first loss function between the first PCA coefficient and the reference PCA coefficient, and the second loss function between the generated lip movement information and the target lip movement information are calculated respectively. The first loss function and the second loss function will be used to adjust parameters of the first network (such as the LSTM network) and the second network (such as the CNN network) in the future, so that results output by the first network and the second network are more accurate.

In operation S450, a parameter of the first network and a parameter of the second network are adjusted based on the first loss function and the second loss function.

For example, the parameter of the first network (such as the LSTM network) may be adjusted according to the first loss function calculated by the above method. The parameters of the first network (such as the LSTM network) and the second network (such as the CNN network) may be adjusted according to the second loss function calculated by the above method, thereby improving the reliability of the predictions of the first network and the second network, and making the results output by the first network and the second network more accurate.

The technical solutions of the embodiments of the present disclosure train the neural network model based on the second speech feature, and use the first speech feature to assist the training in the training process, which improves the accuracy of the model compared to the training method based on only one speech feature. In some embodiments, first speech data and second speech data may respectively come from the 4D data and the 2D data. Compared with using only a speech feature in the 4D data for training, the data acquisition and processing processes are simpler and more efficient.

In order to enable the first network to respectively process the first speech feature and the second speech feature to obtain corresponding PCA coefficients, in some embodiments, the first speech feature may be set to have a first weight, and the second speech feature may be set to have a second weight. The first weight and the second weight are different. The two weight values are set as desired in practice, which are not limited here.

The processing of a semantic feature by the network model is controlled according to the first weight and the second weight. Specifically, the first network performs an operation of determining the first PCA coefficient based on the first speech feature in response to the first weight is a first value and the second weight is a second value. The first network performs the operation of determining the second PCA coefficient based on the second speech feature in response to the first weight is the second value and the second weight is the first value.

For example, the first weight is set as zero and the second weight is set as a non-zero value. When the first weight of the first speech feature is zero and the second weight of the second speech feature is the non-zero value, the first network, such as LSTM, performs the operation of determining the first PCA coefficient based on the first speech feature. When the first weight of the first speech feature is the non-zero value and the second weight of the second speech feature is zero, the first network performs the operation of determining the second PCA coefficient based on the second speech feature. In the above manner, the first network may sequentially process the first speech feature and the second speech feature input into the first network, thereby avoiding the conflict between the processing of the first speech feature and the processing of the second speech feature, and improving the processing efficiency and accuracy.

Figure 5:
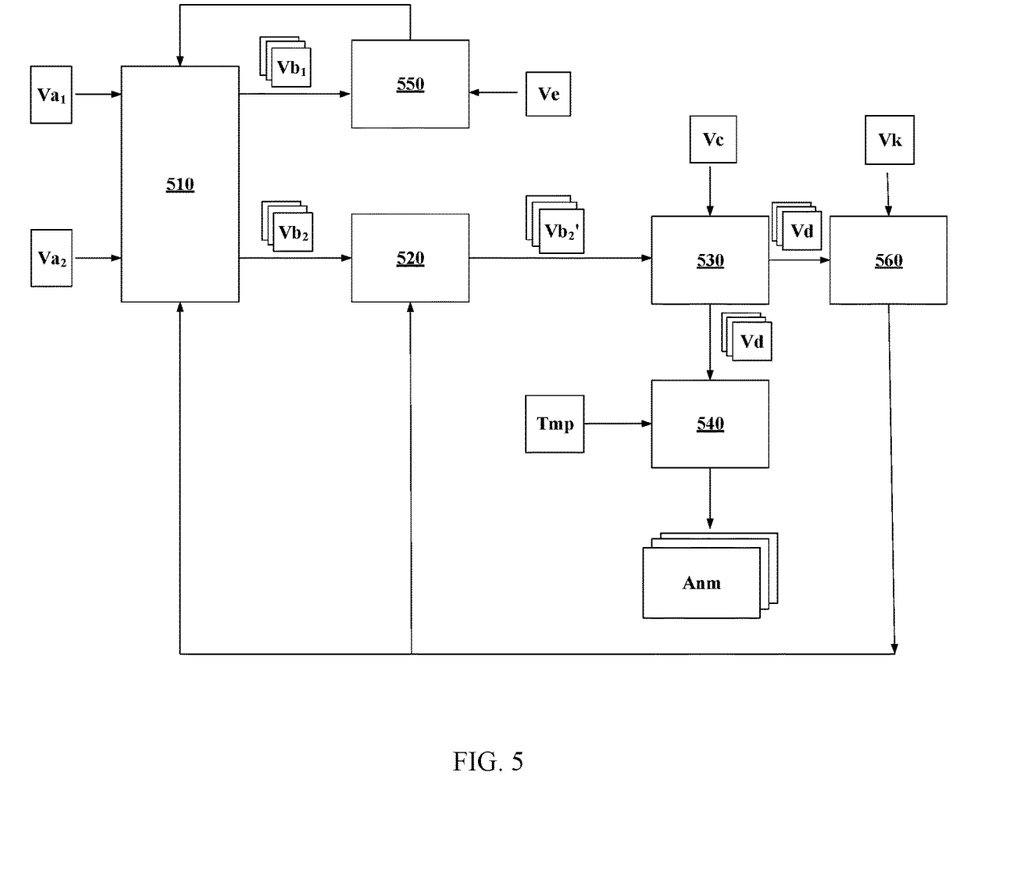
FIG. 5 is a schematic diagram of a method of training a neural network model according to an embodiment of the present disclosure.

FIG. 5 is a schematic diagram of a method of training a neural network model according to an embodiment of the present disclosure. Example implementations of the above operations S410 to S450 will be described below with reference to FIG. 5.

For example, the neural network model shown in FIG. 5 includes a first network 510 (e.g. LSTM) and a second network 520 (e.g. CNN). After the neural network model is trained, it may be used as the neural network model used in the above-mentioned method of generating the 3D video.

As shown in FIG. 5, after obtaining a first speech feature $Va_1$ and a second speech feature $Va_2$, a first PCA coefficient $Vb_1$ is determined based on the first speech feature $Va_1$ using the first network 510, and a second PCA coefficient $Vb_2$ is determined based on the second speech feature $Va_2$ using the first network 510. The second network 520 corrects the second PCA coefficient $Vb_2$ to obtain a corrected second PCA coefficient $Vb_2'$ and output the corrected second PCA coefficient $Vb_2'$.

The lip movement information Vd is calculated (530) based on the corrected second PCA coefficient $Vb_2'$ and the PCA parameter Vc for the neural network model. The lip movement information Vd is applied (540) to the 3D basic avatar model Tmp in the case of closing the mouth to obtain the 3D Video Anm with the lip movement effect. The PCA parameter Vc of the neural network model may be generated, for example, based on the 4D data and the 2D data, and the specific generation method will be described in detail later.

A first loss function is calculated (550) based on the above-mentioned first PCA coefficient $Vb_1$ and a reference PCA coefficient Ve. A parameter of the first network 510 is adjusted based on the first loss function. A second loss function is calculated (560) based on the above-mentioned lip movement information Vd and target lip movement information Vk. Parameters of the first network 510 and the second network 520 are adjusted based on the second loss function to update the first network 510 and the second network 520, thereby improving the reliability of the prediction of the first network and the second network, so that the results output by the first network and the second network are more accurate.

In order to enable the first network to respectively process the first speech feature and the second speech feature, in some embodiments, the above-mentioned first speech feature $Va_1$ may be set to have the first weight, and the above-mentioned second speech feature $Va_2$ may be set to have the second weight. The first weight and the second weight are different. The two weight values are set as desired in practice, which are not limited here.

For example, the first weight is set as zero and the second weight is set as the non-zero value. When the first weight of the first speech feature $Va_1$ is zero and the second weight of the second speech feature $Va_2$ is the non-zero value, the first network 510, such as LSTM, performs the operation of determining the first PCA coefficient $Vb_1$ based on the first speech feature $Va_1$. When the first weight of the first speech feature $Va_1$ is the non-zero value and the second weight of the second speech feature $Va_2$ is zero, the first network 510 performs the operation of determining the second PCA coefficient $Vb_2$ based on the second speech feature $Va_2$. In the above manner, the first network 510 may sequentially process speech features input into the first network 510, thereby improving the processing efficiency and accuracy.

Figure 6:
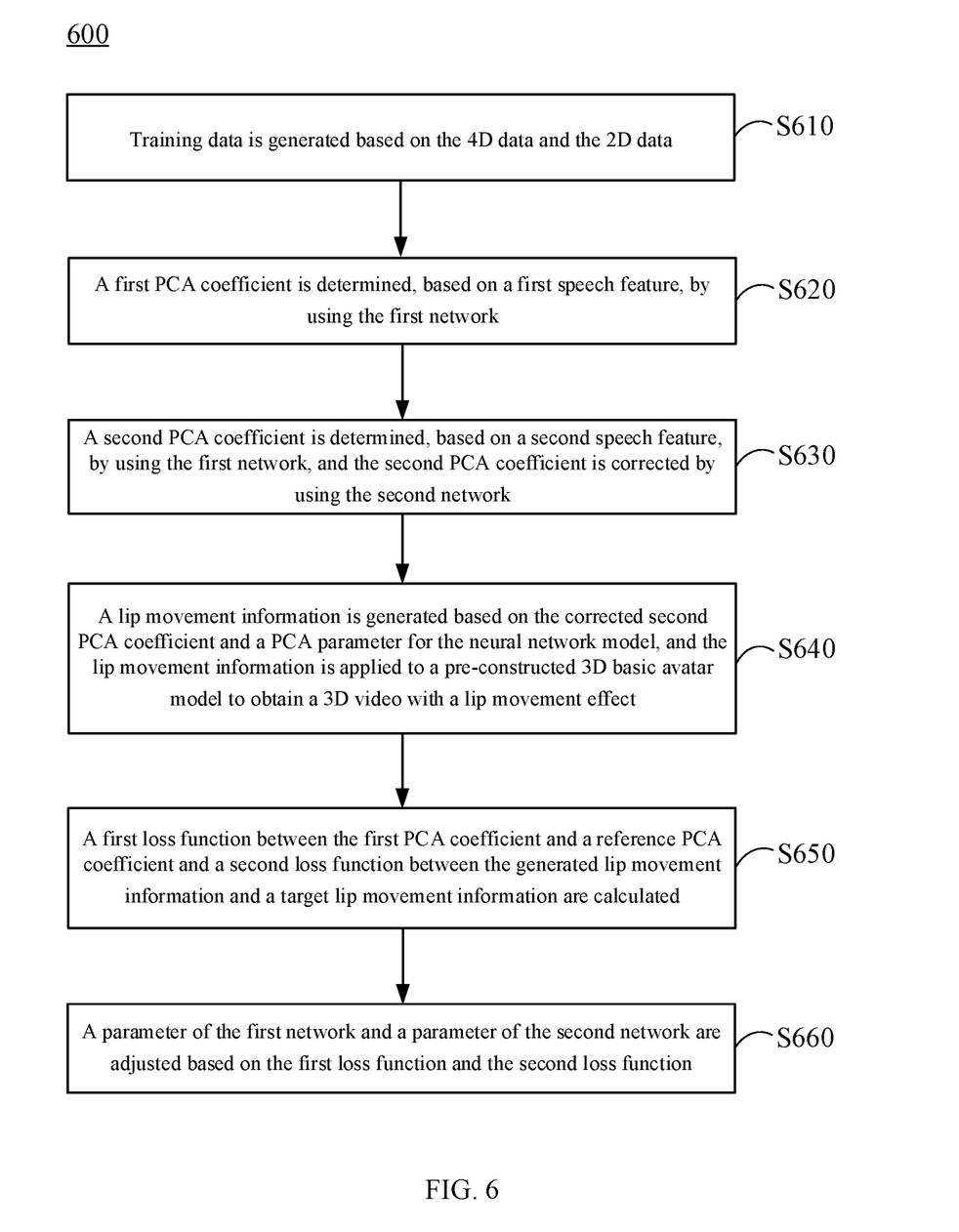
FIG. 6 is a flowchart of a method of training a neural network model according to another embodiment of the present disclosure.

FIG. 6 is a flowchart of a method 600 of training a neural network model according to another embodiment of the present disclosure.

As shown in FIG. 6, in this embodiment, the method of training the neural network model includes operations S610 to S660. The operations S620 to S660 may be implemented respectively in the same manner as the operations S410 to S450, and repeated parts will not be described in detail.

In operation S610, training data is generated based on the 4D data and the 2D data.

The so-called training data here may include, for example, the first speech feature, the second speech feature, the reference PCA coefficient, the PCA parameter of the neural network model, and the target lip movement information. A method of acquiring the above parameters will be described in detail later.

In this operation, for example, the above-mentioned training data may be generated based on the 4D data and the 2D data. The training data will be used in the training process of the model in the future. A specific training method is the same as the process described above, which will not be repeated here.

In the embodiments of the present disclosure, the 4D data is used to assist training in the training process. Compared with model training based entirely on the 4D data, the data acquisition and processing processes are simpler and more efficient.

In operation S620, a first PCA coefficient is determined, based on a first speech feature, by using the first network.

In operation S630, a second PCA coefficient is determined, based on a second speech feature, by using the first network, and the second PCA coefficient is corrected by using the second network.

In operation S640, a lip movement information is generated based on the corrected second PCA coefficient and a PCA parameter for the neural network model, and the lip movement information is applied to a pre-constructed 3D basic avatar model to obtain a 3D video with a lip movement effect.

In operation S650, a first loss function between the first PCA coefficient and a reference PCA coefficient and a second loss function between the generated lip movement information and a target lip movement information are calculated.

In operation S660, a parameter of the first network and a parameter of the second network are adjusted based on the first loss function and the second loss function.

Figure 7:
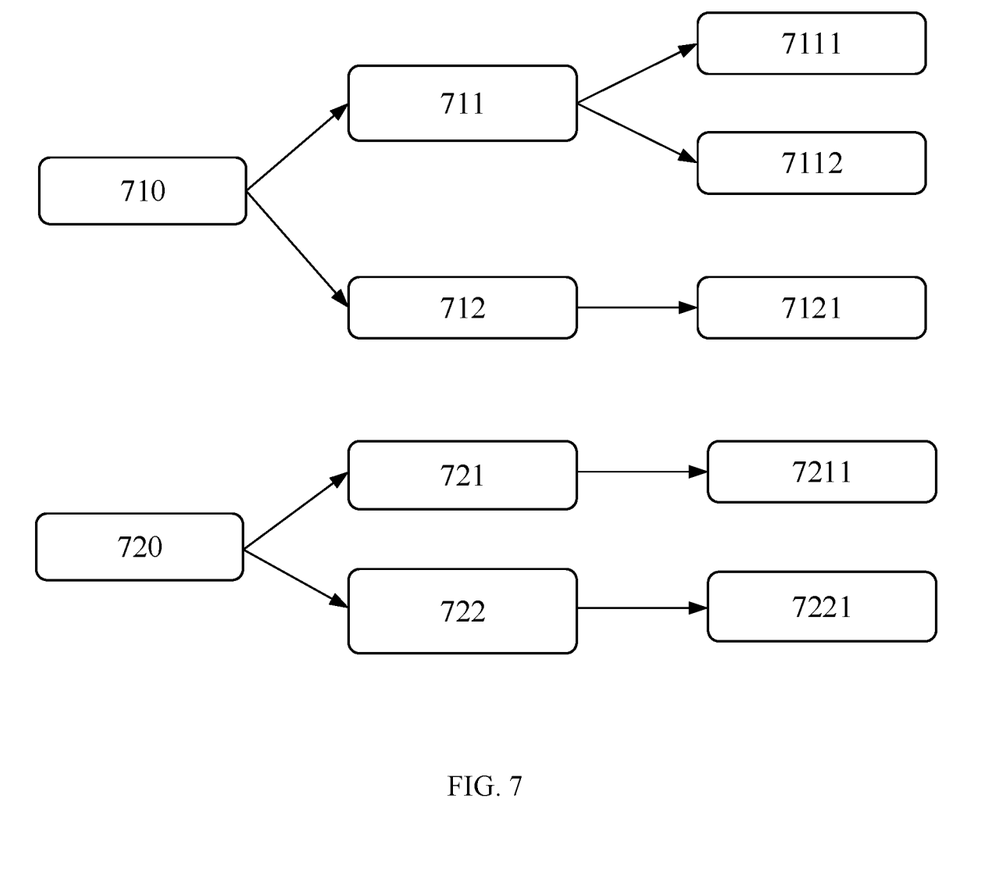
FIG. 7 is a schematic diagram of a method of generating training data according to an embodiment of the present disclosure.

FIG. 7 is a schematic diagram of a method of generating training data according to an embodiment of the present disclosure. An example implementation of generating the training data in the above operation S610 will be described below with reference to FIG. 7.

In this embodiment, the training data may include, for example, the reference PCA coefficient, the PCA parameter for the neural network model and first speech feature which are extracted from the 4D data, and the second speech feature and the target lip movement information which are extracted from the 2D data.

The 4D data may include, for example, the sequence of 3D avatar models and corresponding first audio data. The 2D data may include, for example, 2D image data and corresponding second audio data. An object recorded when generating the 2D data may be the same as an object recorded when generating the 4D data, or they may be different. The 2D data may be generated by recording a video of one or more objects, and the number of the objects is selected as desired in practice, which is not limited here. The method of acquiring the 4D data and the 2D data is the same as or similar to the method described above, which will not be repeated here.

The method of acquiring the above data will be described in detail below with reference to FIG. 7.

As shown in FIG. 7, a sequence 711 of 3D avatar models and first audio data 712 are extracted from 4D data 710 after the 4D data 710 is acquired, wherein the sequence 711 of 3D avatar models includes a plurality of 3D avatar models ordered by time. PCA processing is performed on the sequence 711 of 3D avatar models to obtain a reference PCA coefficient 7111. The reference PCA coefficient 7111 is used to calculate the first loss function with the first PCA coefficient. In addition, a projection of the sequence 711 of 3D avatar models on the reference PCA coefficient 7111 is calculated to obtain a PCA parameter 7112. The PCA parameter 7112 is used to generate the lip movement information. An audio feature about phoneme is extracted from the acquired first audio data 712 to obtain a first speech feature 7121. The first speech feature 7121 is input into the first network as the input speech feature to determine the first PCA coefficient.

A sequence 722 of 2D avatar images and second audio data 721 are extracted from 2D data 720 after the 2D data 720 is acquired. An audio feature about phoneme is extracted from the second audio data 721 to obtain a second speech feature 7211. The second speech feature 7211 is input into the first network as the input speech feature to determine the second PCA coefficient. A 2D lip movement key point is extracted from the sequence 722 of 2D avatar images. The 2D lip movement key point is aligned with the 3D basic avatar model to obtain a 2D lip movement key point aligned with the 3D basic avatar model as a target lip movement information 7221. The target lip movement information 7221 is used to calculate the second loss function with the lip movement information generated in the process of generating the 3D video with the lip movement effect. The method of aligning the 2D lip movement key point with the 3D basic avatar model is the same as the process described above, which will not be repeated here.

In the embodiments of the present disclosure, the 4D data is used to assist training in the training process. Compared with model training based entirely on the 4D data, the data acquisition and processing processes are simpler and more efficient.

Figure 8:
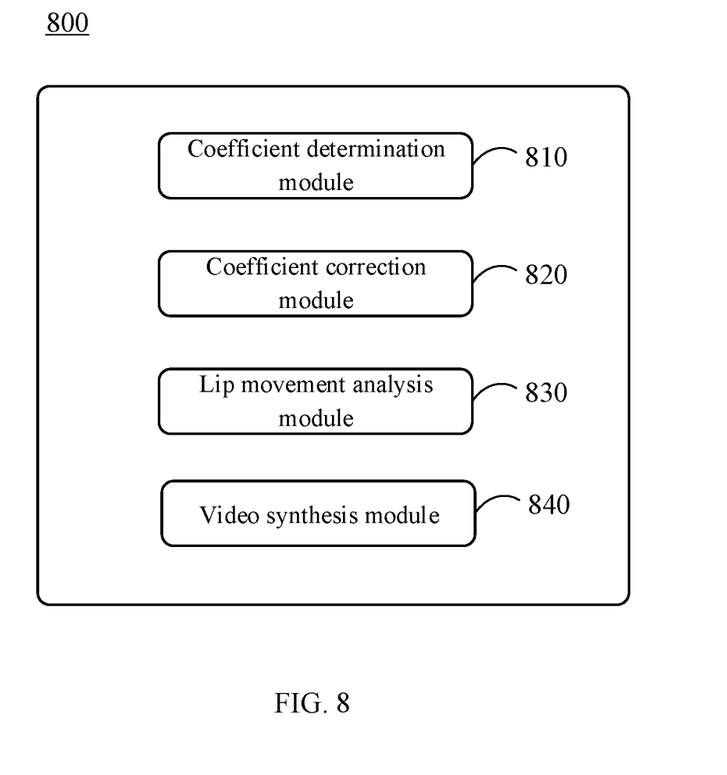
FIG. 8 is a block diagram of an apparatus of generating a 3D video according to an embodiment of the present disclosure.

FIG. 8 is a block diagram of an apparatus of generating a 3D video according to an embodiment of the present disclosure.

As shown in FIG. 8, an apparatus 800 of generating the 3D video includes: a coefficient determination module 810, a coefficient correction module 820, a lip movement analysis module 830 and a video synthesis module 840. The neural network model includes the first network and the second network. In this embodiment of the present disclosure, the definitions of the first network and the second network are the same as or similar to those described above, which are not repeated here.

The coefficient determination module 810 is used to determine, based on an input speech feature, a principal component analysis (PCA) coefficient by using a first network, wherein the PCA coefficient is used to generate the 3D video.

The coefficient correction module 820 is used to correct the PCA coefficient by using a second network.

The lip movement analysis module 830 is used to generate a lip movement information based on the corrected PCA coefficient and a PCA parameter for a neural network model, wherein the neural network model includes the first network and the second network.

The video synthesis module 840 is used to apply the lip movement information to a pre-constructed 3D basic avatar model to obtain a 3D video with a lip movement effect.

In some embodiments of the present disclosure, the above apparatus further includes a feature extraction module. The feature extraction module is used to extract the input speech feature from audio data, or obtain the input speech feature by performing a text to speech (TTS) conversion on a text.

In some embodiments of the present disclosure, the above apparatus further includes a rendering module. The rendering module is used to render the 3D video with the lip movement effect.

Figure 9:
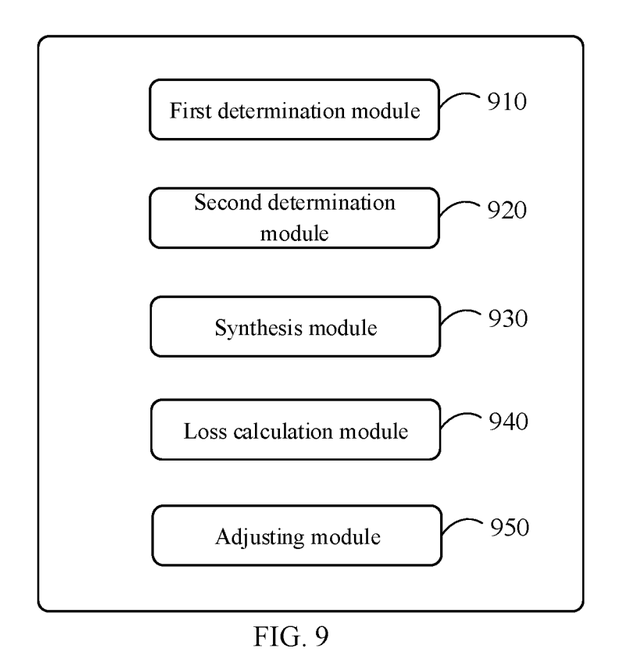
FIG. 9 is a block diagram of an apparatus of training a neural network model according to an embodiment of the present disclosure.

FIG. 9 is a block diagram of an apparatus of training a neural network model according to an embodiment of the present disclosure.

As shown in FIG. 9, an apparatus 900 of training the neural network model includes a first determination module 910, a second determination module 920, a synthesis module 930, a loss calculation module 940 and an adjusting module 950. The neural network model includes the first network and the second network. In this embodiment of the present disclosure, the definitions of the first network and the second network are the same as or similar to those described above, which are not repeated here.

The first determination module 910 is used to determine, based on a first speech feature, a first principal component analysis (PCA) coefficient by using the first network.

The second determination module 920 is used to determine, based on a second speech feature, a second PCA coefficient by using the first network, and correcting the second PCA coefficient by using the second network.

The synthesis module 930 is used to generate a lip movement information based on the corrected second PCA coefficient and a PCA parameter for the neural network model, and apply the lip movement information to a pre-constructed 3D basic avatar model to obtain a 3D video with a lip movement effect.

The loss calculation module 940 is used to calculate a first loss function between the first PCA coefficient and a reference PCA coefficient, and a second loss function between the generated lip movement information and target lip movement information.

The adjusting module 950 is used to adjust, based on the first loss function and the second loss function, a parameter of the first network and a parameter of the second network.

In some embodiments of the present disclosure, the above apparatus further includes a data processing module. The data processing module is used to generate training data based on 4D data and 2D data.

In some embodiments of the present disclosure, the above data processing module includes a first sub-module, a second sub-module, a third sub-module, a fourth sub-module, a fifth sub-module, a sixth sub-module and a seventh sub-module.

The first sub-module is used to extract a 3D avatar model sequence and first audio data from the 4D data, wherein the 3D avatar model sequence includes a plurality of 3D avatar models ordered by time.

The second sub-module is used to perform a PCA processing on the 3D avatar model sequence to obtain the PCA parameter.

The third sub-module is used to calculate a projection of the 3D avatar model sequence on the PCA parameter to obtain the reference PCA coefficient.

The fourth sub-module is used to extract the first speech feature from the first audio data.

The fifth sub-module is used to extract a sequence of 2D avatar images and the second speech feature from the 2D data.

The sixth sub-module is used to extract a 2D lip movement key point from the sequence of 2D avatar images.

The seventh sub-module is used to align the 2D lip movement key point with the 3D basic avatar model, to obtain a 2D lip movement key point aligned with the 3D basic avatar model as the target lip movement information.

In some embodiments of the present disclosure, the above-mentioned first speech feature has a first weight, and the above-mentioned second speech feature has a second weight. The above-mentioned first network is configured to determine, based on the first speech feature, the first PCA coefficient in response to the first weight being a first value and the second weight being a second value, and the first network is configured to determine, based on the second speech feature, the second PCA coefficient in response to the first weight being the second value and the second weight being the first value.

It should be noted that the implementations of each module/unit/sub-unit, the solved technical problems, the achieved functions and the achieved technical effects in the embodiments of the apparatus part of the present disclosure are correspondingly identical or similar to those steps in the embodiments of the method part of the present disclosure, which will not be repeated here.

In the technical solution of the present disclosure, the collection, storage, use, processing, transmission, provision and disclosure of the user's personal information involved are all in compliance with the provisions of relevant laws and regulations, and it does not violate public order and good customs.

According to the embodiments of the present disclosure, the present disclosure further provides an electronic device, a readable storage medium, and a computer program product.

Figure 10:
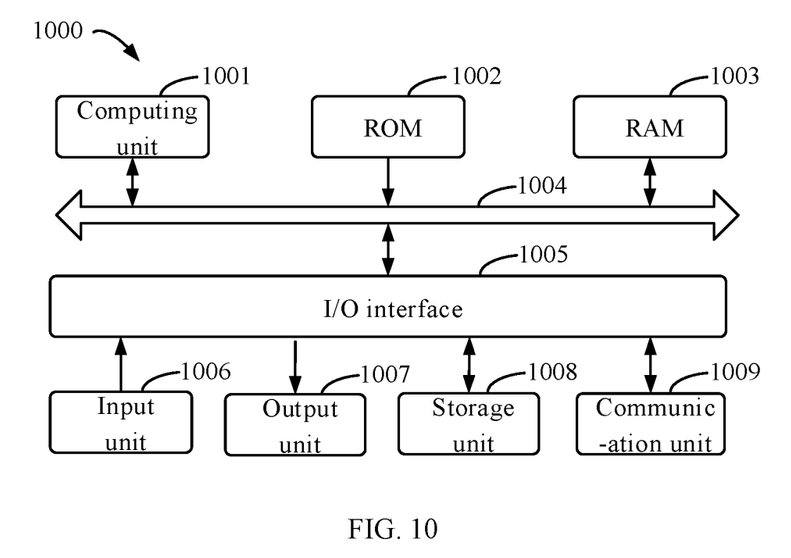
FIG. 10 is a block diagram of an electronic device used to implement a method of generating a 3D video and a method of training a neural network model according to an embodiment of the present disclosure.

FIG. 10 shows a schematic block diagram of an exemplary electronic device 1000 for implementing the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, the device 1000 may include a computing unit 1001, which may perform various appropriate actions and processing based on a computer program stored in a read-only memory (ROM) 1002 or a computer program loaded from a storage unit 1008 into a random access memory (RAM) 1003. Various programs and data required for the operation of the device 1000 may be stored in the RAM 1003. The computing unit 1001, the ROM 1002 and the RAM 1003 are connected to each other through a bus 1004. An input/output (I/O) interface 1005 is further connected to the bus 1004.

Various components in the device 1000, including an input unit 1006 such as a keyboard, a mouse, etc., an output unit 1007 such as various types of displays, speakers, etc., a storage unit 1008 such as a magnetic disk, an optical disk, etc., and a communication unit 1009 such as a network card, a modem, a wireless communication transceiver, etc., are connected to the I/O interface 1005. The communication unit 1009 allows the device 1000 to exchange information/data with other devices through a computer network such as the Internet and/or various telecommunication networks.

The computing unit 1001 may be various general-purpose and/or special-purpose processing components with processing and computing capabilities. Some examples of the computing unit 1001 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 1001 may perform the various methods and processes described above, such as the method of generating the 3D video and the method of training the neural network model. For example, in some embodiments, the method of generating the 3D video and the method of training the neural network model may be implemented as a computer software program that is tangibly contained on a machine-readable medium, such as a storage unit 1008. In some embodiments, part or all of a computer program may be loaded and/or installed on the device 1000 via the ROM 1002 and/or the communication unit 1009. When the computer program is loaded into the RAM 1003 and executed by the computing unit 1001, one or more steps of the method of generating the 3D video and the method of training the neural network model described above may be performed. Alternatively, in other embodiments, the computing unit 1001 may be used to perform the method of generating the 3D video and the method of training the neural network model in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of generating a 3D video, the method comprising:
    determining, based on an input speech feature, a principal component analysis (PCA) coefficient by using a first network, wherein the PCA coefficient is configured to generate the 3D video;
    correcting the PCA coefficient by using a second network;
    generating a lip movement information based on the corrected PCA coefficient and a PCA parameter for a neural network model, wherein the neural network model comprises the first network and the second network; and
    applying the lip movement information to a pre-constructed 3D basic avatar model to obtain the 3D video with a lip movement effect.

2. The method according to claim 1, further comprising extracting the input speech feature from audio data, or obtaining the input speech feature by performing a text-to-speech (TTS) conversion on a text.

3. The method according to claim 1, wherein the first network comprises a long-short term memory (LSTM), and the second network comprises a convolutional neural network (CNN).

4. The method according to claim 1, further comprising rendering the 3D video with the lip movement effect.

5. A non-transitory computer-readable storage medium having computer instructions stored thereon, the computer instructions configured to cause a computer system to implement at least the method of claim 1.

6. A method of training a neural network model, wherein the neural network model comprises a first network and a second network, the method comprising:
    determining, based on a first speech feature, a first principal component analysis (PCA) coefficient by using the first network;
    determining, based on a second speech feature, a second PCA coefficient by using the first network, and correcting the second PCA coefficient by using the second network;
    generating a lip movement information based on the corrected second PCA coefficient and a PCA parameter for the neural network model, and applying the lip movement information to a pre-constructed 3D basic avatar model to obtain a 3D video with a lip movement effect;
    calculating a first loss function between the first PCA coefficient and a reference PCA coefficient, and a second loss function between the generated lip movement information and a target lip movement information; and
    adjusting, based on the first loss function and the second loss function, a parameter of the first network and a parameter of the second network.

7. The method according to claim 6, further comprising generating training data based on 4D data and 2D data, wherein the training data comprises the first speech feature, the second speech feature, the reference PCA coefficient, the PCA parameter, and the target lip movement information.

8. The method according to claim 7, wherein generating the training data comprises:
    extracting a 3D avatar model sequence and first audio data from the 4D data, wherein the 3D avatar model sequence comprises a plurality of 3D avatar models ordered by time;
    performing a PCA processing on the 3D avatar model sequence to obtain the PCA parameter;

calculating a projection of the 3D avatar model sequence on the PCA parameter to obtain the reference PCA coefficient;

extracting the first speech feature from the first audio data;

extracting a sequence of 2D avatar images and the second speech feature from the 2D data;

extracting a 2D lip movement key point from the sequence of 2D avatar images; and aligning the 2D lip movement key point with the 3D basic avatar model, to obtain a 2D lip movement key point aligned with the 3D basic avatar model as the target lip movement information.

9. The method according to claim 6, wherein the first speech feature has a first weight, and the second speech feature has a second weight, and wherein the first network determines, based on the first speech feature, the first PCA coefficient in response to the first weight being a first value and the second weight being a second value, and the first network determines, based on the second speech feature, the second PCA coefficient in response to the first weight being the second value and the second weight being the first value.

10. The method according to claim 6, wherein the first network comprises a long-short term memory (LSTM), and the second network comprises a convolutional neural network (CNN).

11. A non-transitory computer-readable storage medium having computer instructions stored thereon, the computer instructions configured to cause a computer system to implement at least the method of claim 6.

12. An electronic device, comprising:
at least one processor; and
a memory communicatively connected to the at least one processor, wherein the memory stores instructions executable by the at least one processor, the instructions, when executed by the at least one processor, configured to cause the at least one processor to implement at least the method of claim 1.

13. The electronic device according to claim 12, wherein the instructions are further configured to cause the at least one processor to extract the input speech feature from audio data, or obtain the input speech feature by performing a text-to-speech (TTS) conversion on a text.

14. The electronic device according to claim 12, wherein the first network comprises a long-short term memory (LSTM), and the second network comprises a convolutional neural network (CNN).

15. The electronic device according to claim 12, wherein the instructions are further configured to cause the at least one processor to render the 3D video with the lip movement effect.

16. An electronic device, comprising:
at least one processor; and
a memory communicatively connected to the at least one processor, wherein the memory stores instructions executable by the at least one processor, the instructions, when executed by the at least one processor, configured to cause the at least one processor to implement at least the method of claim 6.

17. The electronic device according to claim 16, wherein the instructions are further configured to cause the at least one processor to generate training data based on 4D data and 2D data, wherein the training data comprises the first speech feature, the second speech feature, the reference PCA coefficient, the PCA parameter, and the target lip movement information.

18. The electronic device according to claim 17, wherein the instructions are further configured to cause the at least one processor to:

extract a 3D avatar model sequence and first audio data from the 4D data, wherein the 3D avatar model sequence comprises a plurality of 3D avatar models ordered by time;

perform a PCA processing on the 3D avatar model sequence to obtain the PCA parameter;

calculate a projection of the 3D avatar model sequence on the PCA parameter to obtain the reference PCA coefficient;

extract the first speech feature from the first audio data;

extract a sequence of 2D avatar images and the second speech feature from the 2D data;

extract a 2D lip movement key point from the sequence of 2D avatar images; and align the 2D lip movement key point with the 3D basic avatar model, to obtain a 2D lip movement key point aligned with the 3D basic avatar model as the target lip movement information.

19. The electronic device according to claim 16, wherein the first speech feature has a first weight, and the second speech feature has a second weight, and wherein the first network determines, based on the first speech feature, the first PCA coefficient in response to the first weight being a first value and the second weight being a second value, and the first network determines, based on the second speech feature, the second PCA coefficient in response to the first weight being the second value and the second weight being the first value.

20. The electronic device according to claim 16, wherein the first network comprises a long-short term memory (LSTM), and the second network comprises a convolutional neural network (CNN).

* * * * *